United States Patent
Chang

(10) Patent No.: US 10,956,973 B1
(45) Date of Patent: Mar. 23, 2021

(54) SYSTEM AND METHOD FOR VERIFIABLE INVOICE AND CREDIT FINANCING

(71) Applicant: LedgerFunding, Inc., Elmhurst, NY (US)

(72) Inventor: Ling Wei Chang, Elmhurst, NY (US)

(73) Assignee: LedgerFunding, Inc., Elmhurst, NY (US)

( * ) Notice: Subject to any disclaimer, the term of this patent is extended or adjusted under 35 U.S.C. 154(b) by 626 days.

(21) Appl. No.: 15/674,547

(22) Filed: Aug. 11, 2017

Related U.S. Application Data

(63) Continuation-in-part of application No. 15/642,355, filed on Jul. 6, 2017, now abandoned.

(60) Provisional application No. 62/359,125, filed on Jul. 6, 2016.

(51) Int. Cl.
| | |
|---|---|
| *G06Q 30/00* | (2012.01) |
| *G06Q 40/02* | (2012.01) |
| *G06Q 30/06* | (2012.01) |
| *G06Q 20/06* | (2012.01) |

(52) U.S. Cl.
CPC ....... *G06Q 40/025* (2013.01); *G06Q 30/0611* (2013.01); *G06Q 30/0633* (2013.01); *G06Q 20/065* (2013.01)

(58) Field of Classification Search
CPC ............. G06Q 40/025; G06Q 30/0611; G06Q 20/065; G06Q 30/0633
USPC ......................................... 705/26.4, 26.8, 38
See application file for complete search history.

(56) References Cited

U.S. PATENT DOCUMENTS

| | | |
|---|---|---|
| 5,970,475 A | 10/1999 | Barnes |
| 6,151,588 A | 11/2000 | Tozzoli |
| 7,433,897 B1 | 10/2008 | Webb |
| 8,065,202 B1 | 11/2011 | Ballaro |
| 8,069,096 B1 | 11/2011 | Ballaro |
| 2002/0116332 A1 | 8/2002 | Sanchez |
| 2002/0120537 A1 | 8/2002 | Morea |
| 2003/0074273 A1 | 4/2003 | Miller |
| 2004/0111328 A1 | 6/2004 | Espejo |
| 2005/0010491 A1 | 1/2005 | Luo |
| 2007/0156584 A1 | 7/2007 | Barnes |
| 2007/0192218 A1 | 8/2007 | Licardi |
| 2007/0282744 A1 | 12/2007 | Barnes |
| 2008/0010198 A1* | 1/2008 | Eliscu .................. G06Q 20/102 705/40 |
| 2008/0221915 A1 | 9/2008 | Berkowitz |
| 2008/0300959 A1 | 12/2008 | Sinha |
| 2009/0187482 A1 | 7/2009 | Blount |

(Continued)

FOREIGN PATENT DOCUMENTS

| | | |
|---|---|---|
| AU | 2016100059 | 3/2016 |
| AU | 2016100059 A4 | 3/2016 |

(Continued)

OTHER PUBLICATIONS

Burniske, Chris. Bitcoin and Ethereum: How Smart Contracts Work. May 29, 2016 (May 29, 2016). Ark Invest. (Year: 2016).*

(Continued)

*Primary Examiner* — Allison G Wood
(74) *Attorney, Agent, or Firm* — Graeser Associates International Inc; D'Vorah Graeser

(57) ABSTRACT

A system and method for supporting verifiable invoice and credit financing in a verifiable manner across a plurality of different platforms.

26 Claims, 10 Drawing Sheets

(56) References Cited

U.S. PATENT DOCUMENTS

| | | | |
|---|---|---|---|
| 2014/0089228 A1* | 3/2014 | Silberman | G06Q 40/06 705/36 R |
| 2015/0379510 A1 | 12/2015 | Smith | |
| 2016/0321654 A1* | 11/2016 | Lesavich | G06F 21/6245 |
| 2017/0243193 A1* | 8/2017 | Manian | G06Q 20/3829 |
| 2017/0279774 A1* | 9/2017 | Booz | G06F 16/24568 |

FOREIGN PATENT DOCUMENTS

| | | |
|---|---|---|
| CN | 103927659 A | 7/2014 |
| CN | 105427104 A | 3/2016 |
| EP | 1041521 A2 | 4/2000 |
| EP | 1041521 A2 | 10/2000 |
| JP | 2001065433 A1 | 9/2001 |
| JP | WO2001065433 A1 | 7/2003 |
| JP | 2008159023 A | 7/2008 |
| TW | 200604884 | 2/2006 |
| TW | 200604884 A | 2/2006 |
| WO | 0123979 | 4/2001 |
| WO | 0123979 A2 | 4/2001 |
| WO | 02086779 | 10/2002 |
| WO | 02086779 A1 | 10/2002 |
| WO | 2009094020 | 7/2009 |
| WO | 2009094020 A1 | 7/2009 |

OTHER PUBLICATIONS

Feb. 1, 2016, Young, J., "Chinese E-Commerce Giant Alibaba Explores Blockchain-based Cloud Service Platform", Disqus Article, pp. 1-13, https://bitcoinmagazine.com/articles/chinese-ecommerce-giant-alibaba-explores-blockchain-based-cloud-service-platform-1454360796.

Apr. 26, 2016, Digital Asset, "Frequently Asked Questions", pp. 1-11, https://digitalasset.com/faqs.html.

Apr. 26, 2016, Ethereum Project, "Build unstoppable applications", pp. 1-12, http://www.ethereum.org/.

Sep. 2005, Albrecht, C. et al. "Marketplace and technology standards for B2B e-commerce: progress, challenges and the state of the art", Information and Management, vol. 42, Issue 6, pp. 865-875.

Apr. 26, 2016, Openchain.pdf, "Blockchain technology for the enterprise", pp. 1-18, http://www.openchain.org.

Apr. 26, 2016, India Bitcoin, "Payments Veterans Seek to Unlock Blockchain's Power with Align Commerce"[CoinDesk] pp. 1-10, www.indiabitcoin.com.

Feb. 1, 2016, Young, J., "Chinese E-Commerce Giant Alibaba Explores Blockchain-based Cloud Service Platform", Disqus Article, pp. 1-13, https://bitcoinmagazine.com/articles/chinese-ecommerce-giant-alibaba-explores-blockchain-based-cloud-service-plafform-1454360796.

\* cited by examiner

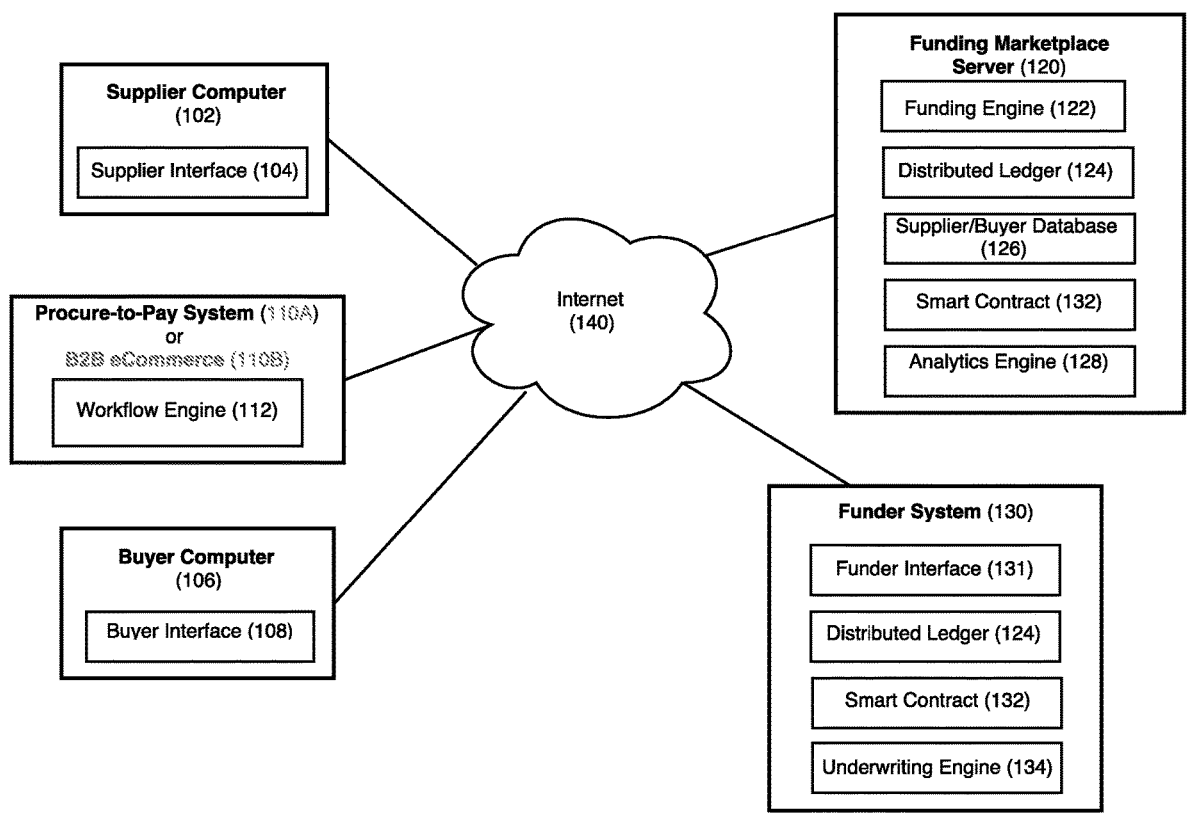
Fig. 1: System 100

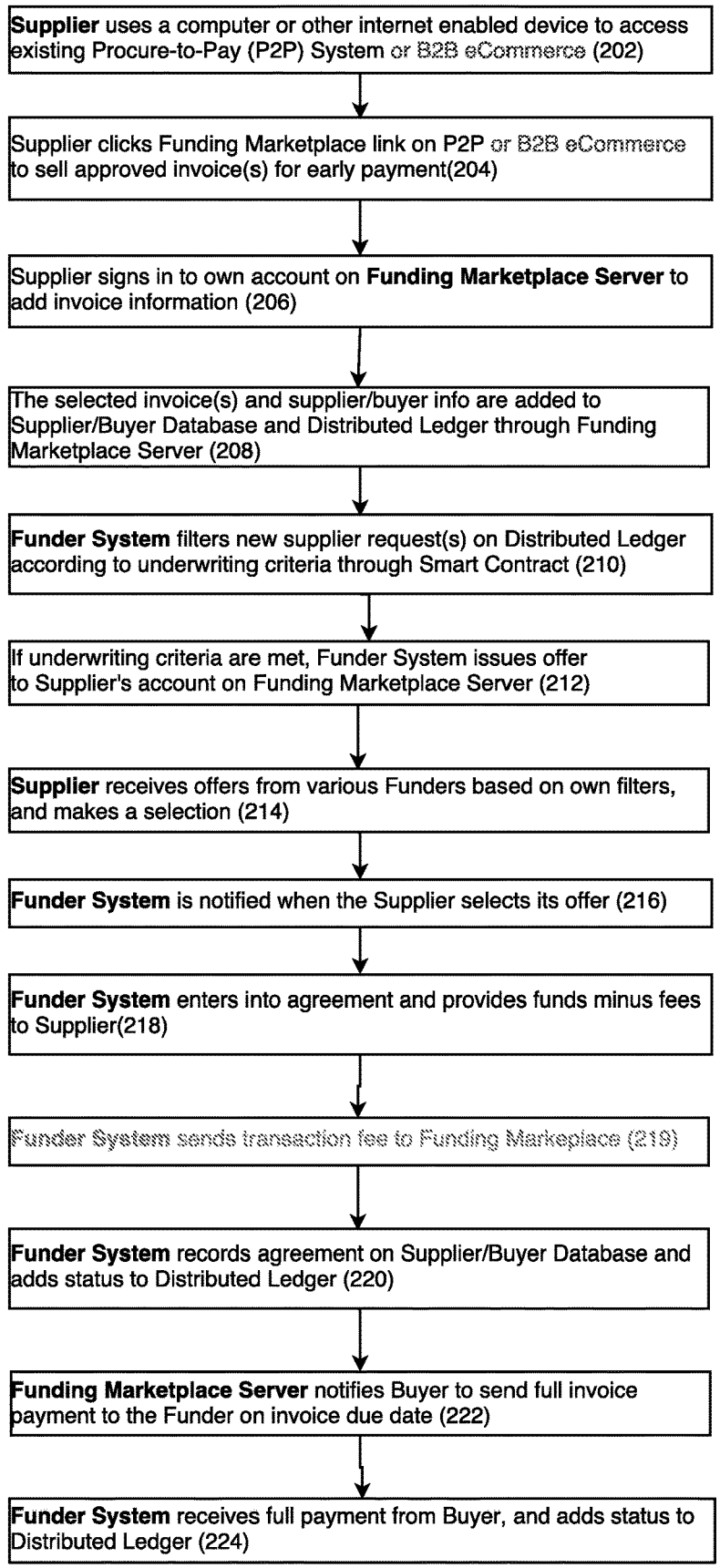
Fig. 2A: Process 200

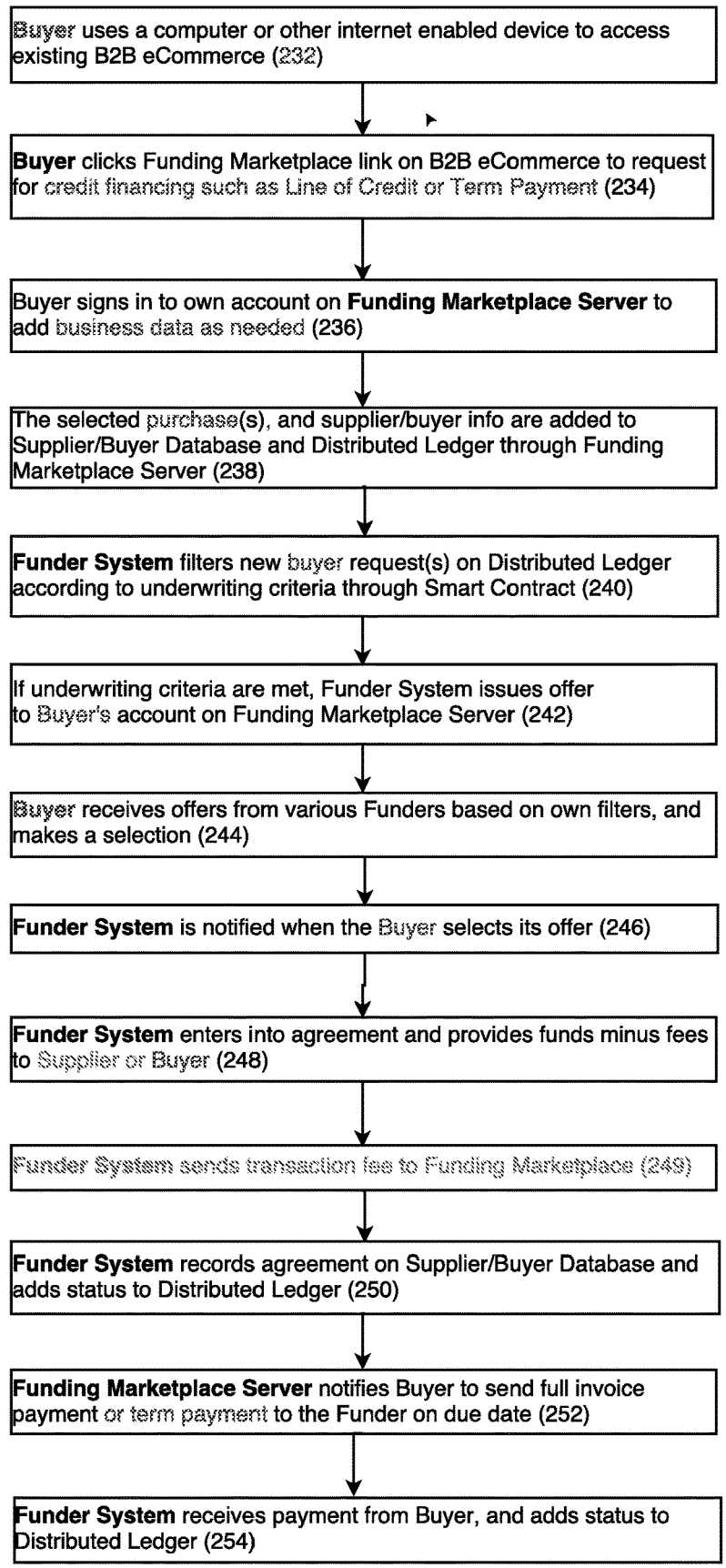

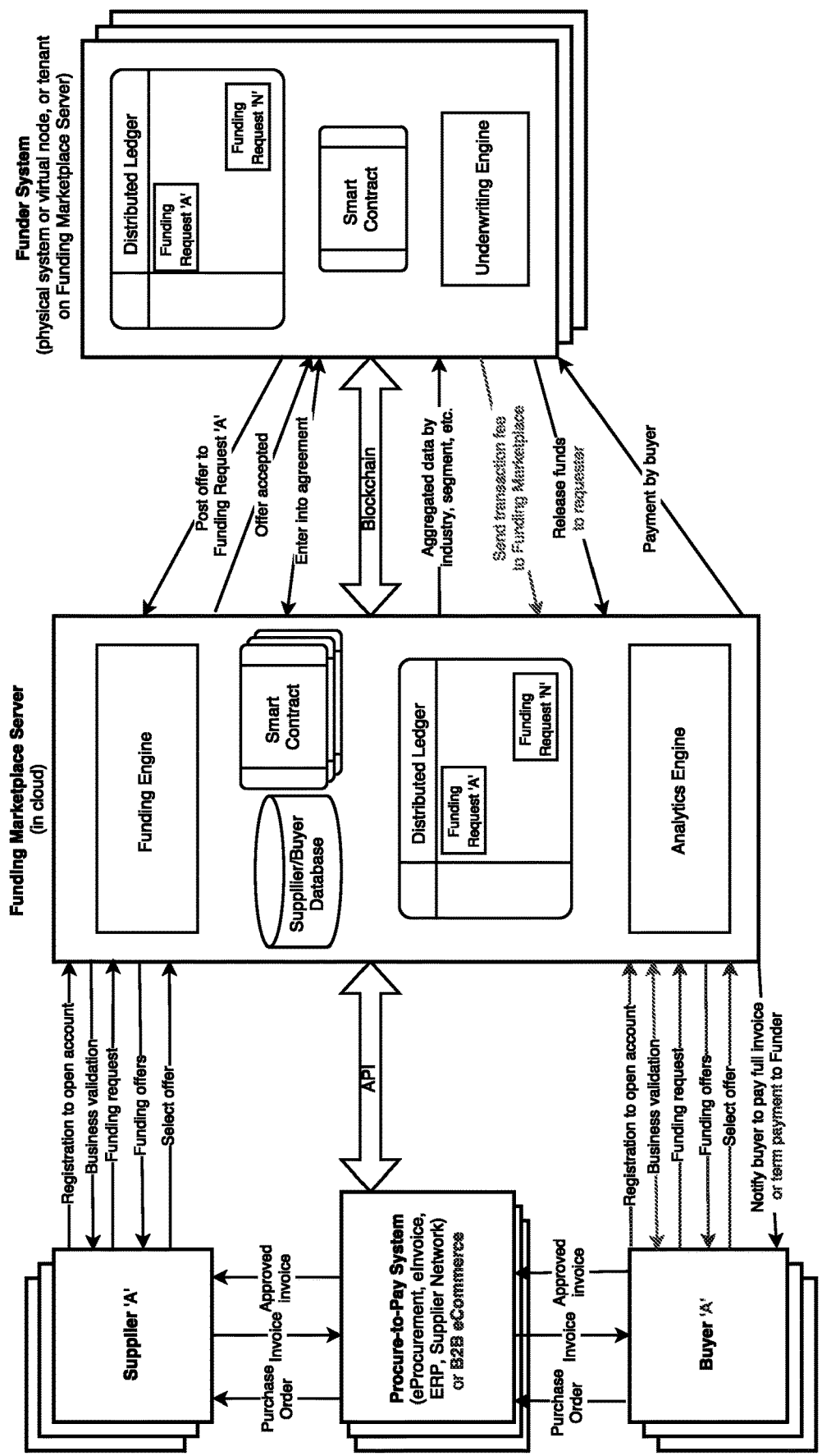
Fig. 3A: System Flow

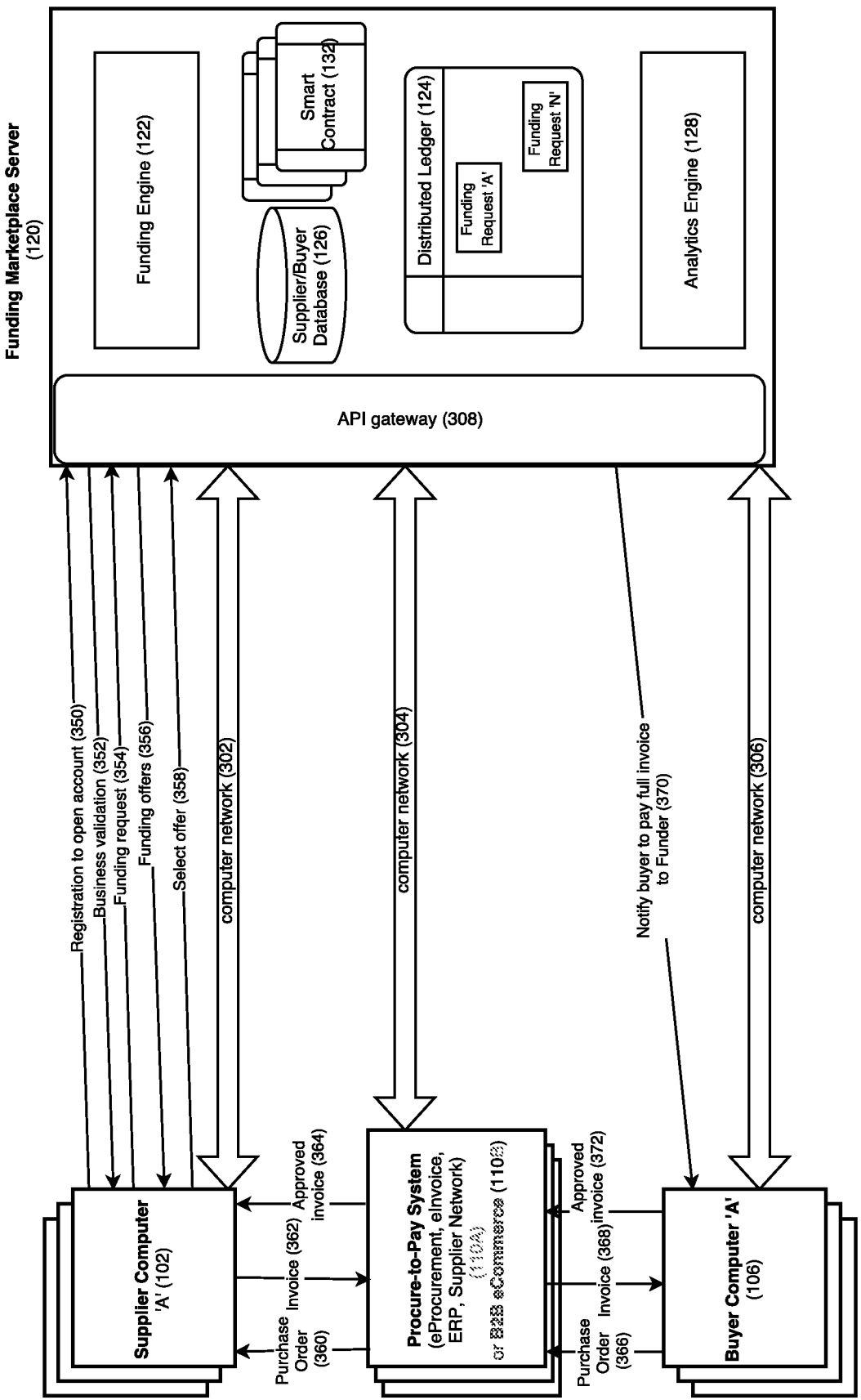
Fig. 3B: Supplier-Side Flow For System 300

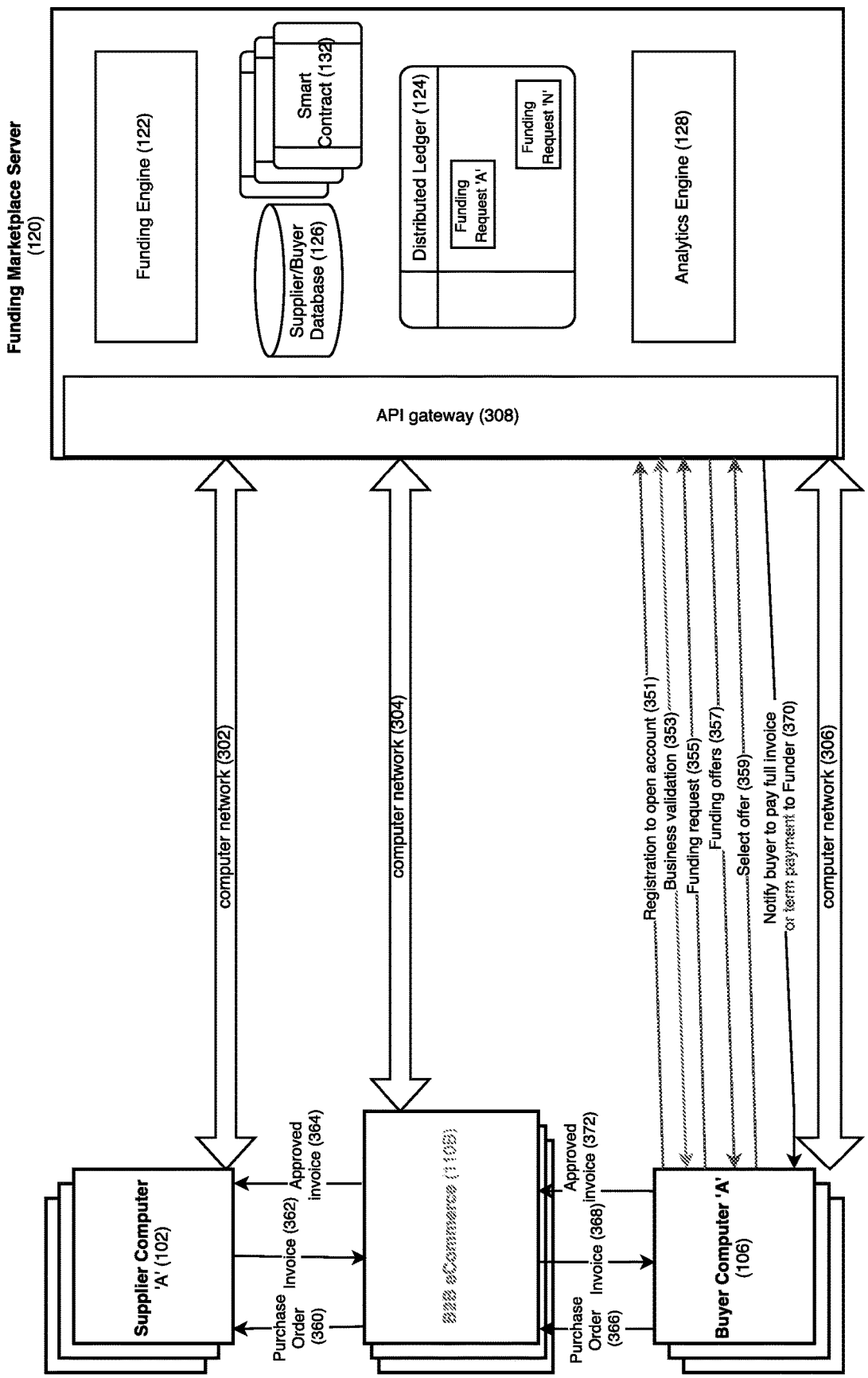
Fig. 3B2: Buyer-Side Flow For System 300

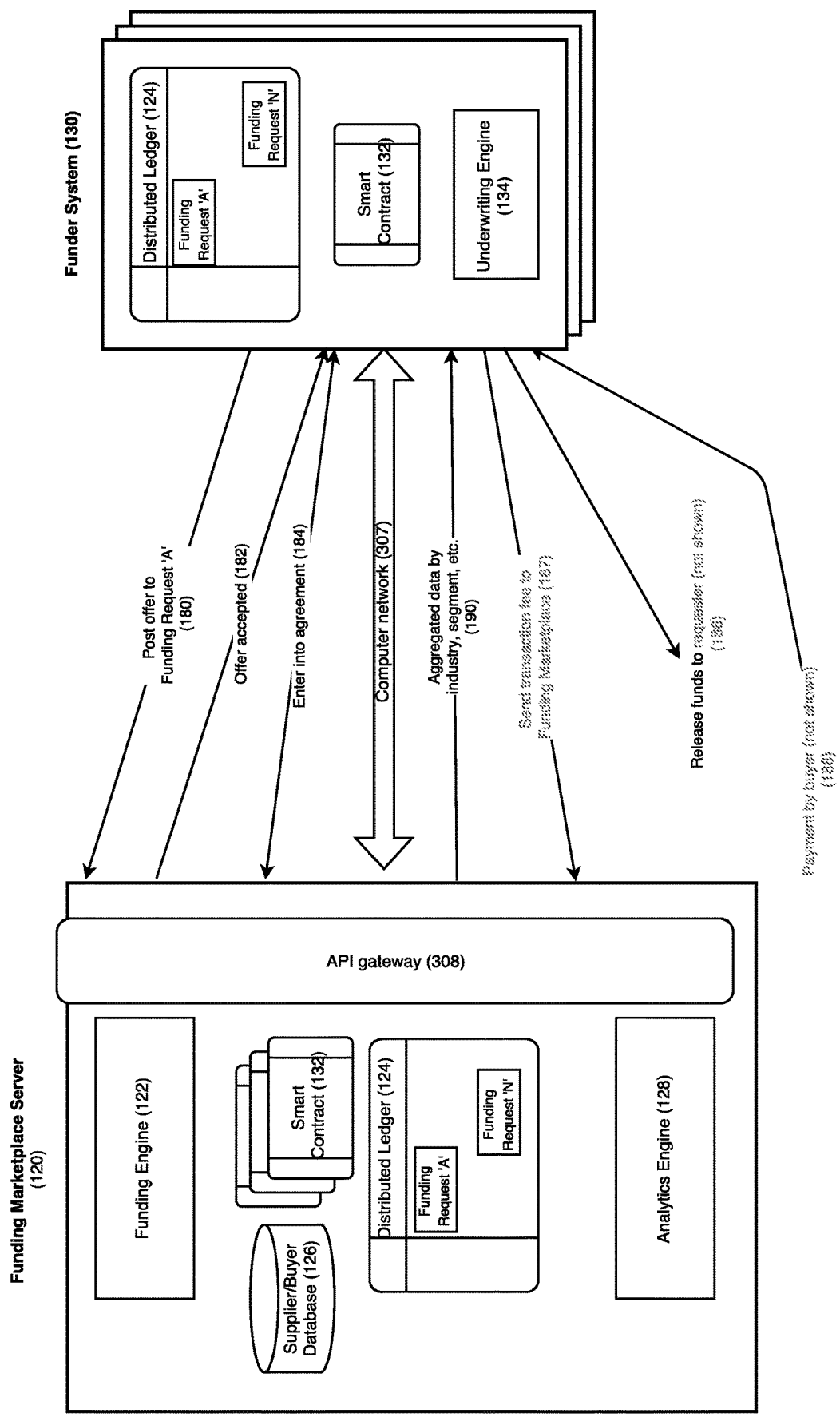
Fig. 3C: Funder-side flow for system 300

Fig. 4: Flowchart for Funder System
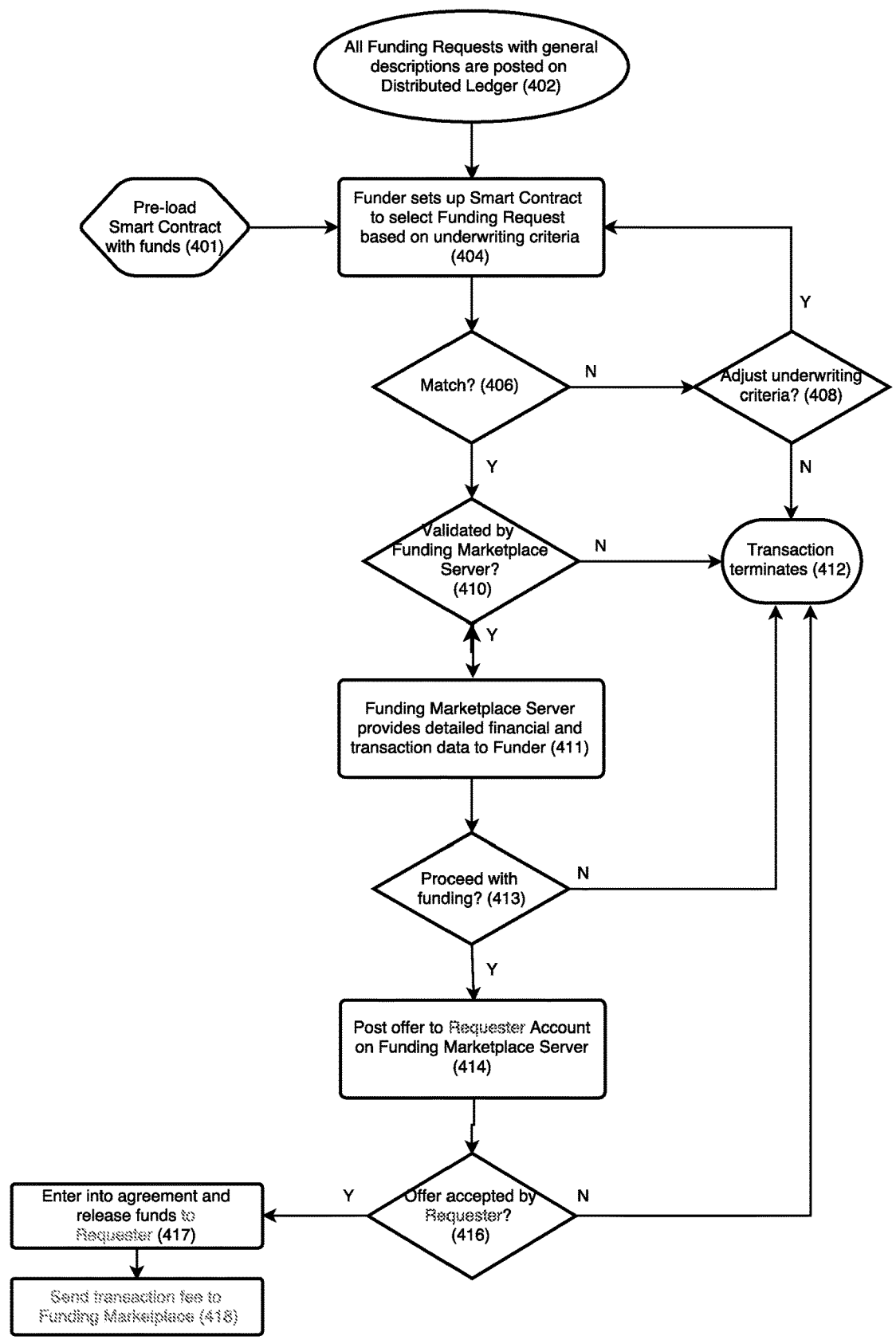

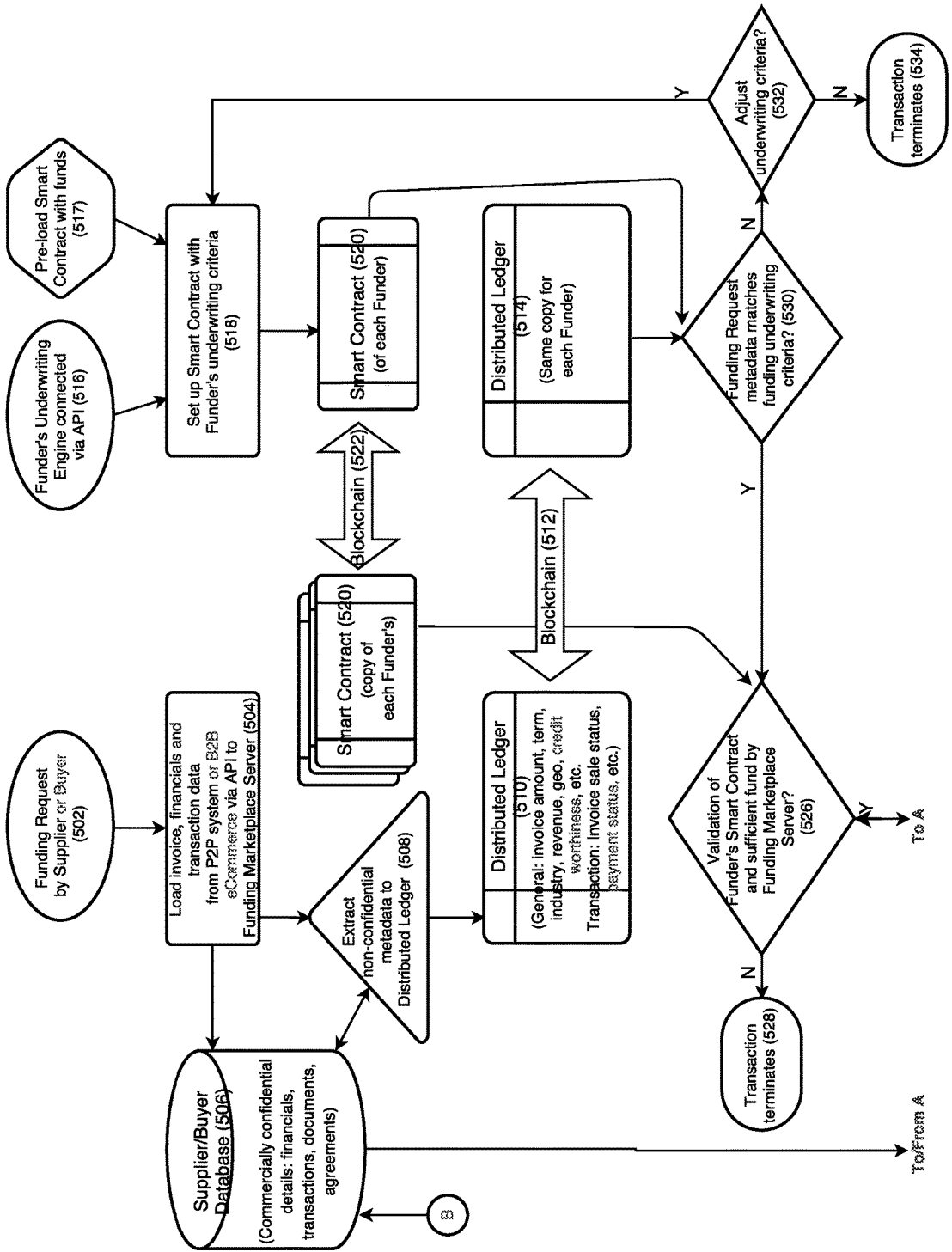
Fig. 5A: Funding Flows for Underwriting, Smart Contract, and Distributed Ledger

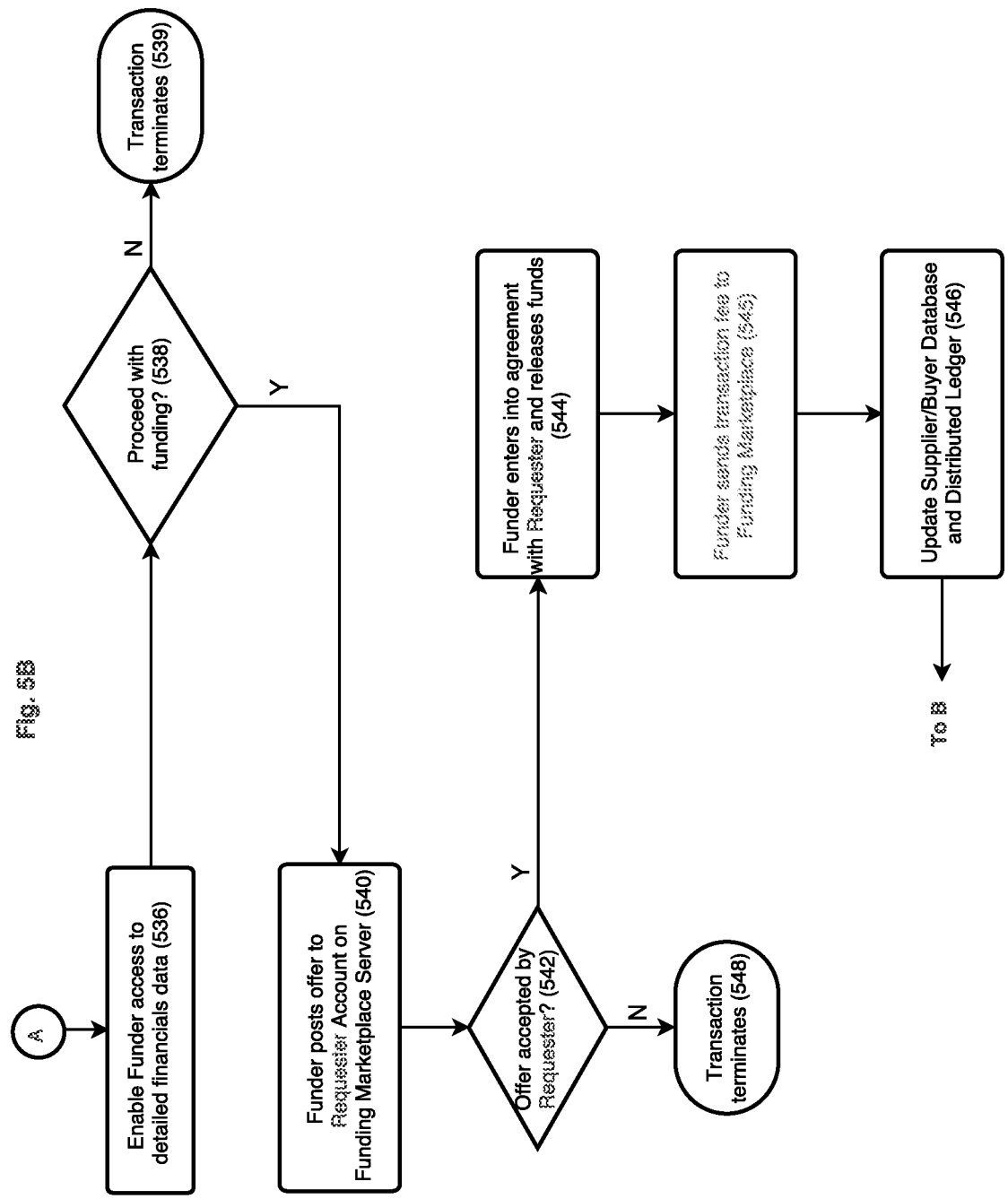

SYSTEM AND METHOD FOR VERIFIABLE INVOICE AND CREDIT FINANCING

FIELD OF THE INVENTION

The present invention, in at least some embodiments, relates to a system and method for supporting verifiable invoice and/or credit financing and in particular, to such a system and method which supports automatic transactions for such financing which are widely verifiable across a plurality of different platforms.

BACKGROUND OF THE INVENTION

It is known for suppliers of products and/or services to issue invoices to buyers, which then typically pay within a predefined period of time. However, suppliers may have difficulty maintaining their cash flow because of the elapsed time between when the product or service is supplied, and the time that the invoice is paid. Such a period of elapsed time can be particularly difficult for smaller suppliers, those in capital intensive industries, and suppliers undergoing rapid growth.

To assist suppliers with this cash flow problem, various types of financing are available to provide money more quickly to suppliers. "Factoring" involves purchase of the invoice and collection process by a financier or factor, and reliant solely on information from suppliers; typically the supplier only receives a fraction of the invoice value, but the money is received rapidly. "Invoice Discounting" (or "Receivable Finance"), with insurance, typically pays more to the supplier overall, but the supplier is responsible for collecting its own invoice. "Reverse Factoring" (or "Supply Chain Finance" or "SCF") can provide the highest payment to the supplier, but usually involves confirmation of payment by the buyer—and of course, a reliable buyer that is likely to pay the invoice.

For business buyers, term payments—net 30 days, net 45 days, etc.—are common in trade but not yet prevalent for B2B eCommerce platforms. The consumerization of digital economy necessitates the trend for immediate payment in B2B transactions, thereby driving the requirement for buyers to obtain and use line-of-credit for purchases. Alternatively, buyers can use third-party credit financing solution to make term payments. These credit financing solutions typically alleviate the credit checking of the buyers by the suppliers, and enhance the buying experience to that for a consumer.

All of these solutions have been automated to certain extent by technology where applicable, but they usually involve an intermediary to provide matchmaking or auctioning between suppliers and financiers, or a buyer-initiated program with predefined parameters. There have been cases of fraud in which financial information was altered by the intermediary to meet lending criteria and increase transaction volume. There are concerns on protecting the privacy of parties to the commercial transactions and contracts, transparency in processes, as well as to set transparent pricing for these various types of finance.

Furthermore, the available solutions are not widely applicable outside of specific industries and/or specific countries, even then, there have been fraudulent cases of supplier selling the same invoice to multiple financiers to collect multiple payments. Buyers work with captive credit financing programs which may not offer the best terms. There are no widely available international solutions which can overcome the problems of determining credit risk in different countries, for example. Thus, suppliers which could benefit from invoice financing, and buyers which could benefit from credit financing—and financiers which might otherwise be interested in providing such financing—they are unable to make the connection and hence to benefit globally.

SUMMARY OF THE INVENTION

There is thus a need for, and it would be useful to have, a system and method for supporting verifiable invoice as well as credit based financing which is verifiable across a plurality of different platforms—and even optionally internationally.

The system and method of the present invention, in at least some embodiments, overcomes these drawbacks of the background art by supporting verifiable invoice and optionally credit based financing in a verifiable manner across a plurality of different platforms.

According to some embodiments of the present invention, there's provided a system for enabling a safe, secure, and completely verifiable manner for enabling suppliers, buyers or both, to obtain funding from funders, for example on the basis of invoices (in the case of suppliers), or on the basis of a credit model and the determination of credit worthiness (in the case of buyers). Optionally and preferably, verification is provided through provision of information through a cryptocurrency or a digital currency, or a blockchain-based network, or any other system which features a distributed ledger.

Any blockchain which involves a distributed ledger, which preferably requires some type of cryptography, more preferably a public/private key encryption system, or hash or digital signatures, may optionally be used. Once a change—such as acceptance of a contract between a supplier and a financier or funder—is made and is written to the distributed ledger, this change is automatically securely, non-falsifiably, that is completely accurately, replicated to other entities who are interested in this information.

The nature of the distributed ledger is such that all parties to a transaction—including optionally the buyer for example—can see the details of the transaction, the stage of the transaction (for example, agreement signed but funds not yet transferred to the supplier) and optionally further requirements for the transaction to be complete. The distributed ledger also means that specialty APIs (Application Programming Interfaces) could theoretically and optionally not be required, as each party would need only the distributed ledger access to verify the details of the transaction. Preferably the distributed ledger is protected with cryptography so that unauthorized parties would be unable to read and/or write to the ledger.

Such a distributed ledger would also have the advantage of fraud prevention with immutable, append-only Distributed Ledger Technology. As non-limiting examples: the supplier cannot post duplicate invoices to sell. Financial documents cannot be altered by an intermediary. The funder cannot fraudulently claim that an agreement had been made or funds had been transferred when in fact these actions were not taken.

According to at least some embodiments, the marketplace for selling such invoices may optionally be connected directly to a Procure-to-Pay (P2P) or B2B eCommerce system as is known in the art. Such a system may optionally host the invoices and may also optionally permit communication with the buyer of the product or service, which needs to pay for the invoice. For example, connection to the P2P or B2B eCommerce system may optionally allow predetermination of the permission of the buyer or supplier to sell the invoice to a funder or other third party. This direct connection would support a lower cost of customer acquisition by embedding funding process to existing P2P or B2B eCommerce systems, where "customer" in this example may optionally be the supplier for example. The direct connection could also optionally lower costs overall.

According to at least some embodiments, at least some aspects for determining whether a particular funder (or preferably and more specifically, a particular funder system) is able to review a request for funding from a supplier through a supplier computer, or alternatively through a P2P or B2B eCommerce system, are determined according to a smart contract. As is known in the art, a "smart contract" may optionally comprise self-executing or otherwise automated code, and/or may optionally comprise information written in a distributed ledger, even if not self-executing. As described herein, both types of smart contract may optionally be considered with the term "smart contract." That is, even if the smart contract is embodied as information written in the distributed ledger, such as the blockchain, rather than self-executing code, or vice versa, both types of smart contract implementations may optionally be used with the present invention.

According to at least some embodiments, the present invention may optionally be implemented through the blockchain. Optionally, the blockchain can run code. As is known in the art, blockchains can perform more complex operations, defined in full-fledged programming languages. However, it is not a requirement for the blockchain to run code in order for the present invention to be implemented. Optionally only a distributed ledger is required, in which information is written that is securely available to all parties through cryptographic access to the distributed ledger.

According to at least some embodiments the blockchain is optionally a public or permissionless blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permissionless blockchains are secured by cryptoeconomics—the combination of economic incentives and cryptographic verification using mechanisms such as proof of work or proof of stake, following a general principle that the degree to which someone can have an influence in the consensus process is proportional to the quantity of economic resources that they can bring to bear.

Alternatively and optionally, the blockchain is a consortium blockchain, such as Hyperledger, where the consensus process is controlled by a pre-selected set of nodes, which for example may optionally be financial institutions. Such a blockchain is partially decentralized.

If the blockchain is private or permissioned—that is, centrally controlled by an operating entity to authorize participation—then optionally all members of the system as described by the present invention which need access are provided with cryptographic access, and become members of the private or permissioned blockchain system, such as Hyperledger.

Hyperledger has its own set of protocols and consensus process, which may optionally be used with smart contracts, to prevent fraud through providing the same asset (invoice) more than once for financing.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

For all of these examples, security for the blockchain may optionally and preferably be provided through cryptography, such as public/private key, hash function or digital signature, as is known in the art.

Optionally, for buyers seeking financing, then a third party credit model and/or credit data may optionally be used to determine credit worthiness. Optionally also supplier history with the buyer could be used, in terms of payment timeliness. Also optionally payment behavior on the part of the buyer may be determined from transactions on the distributed ledger.

Optionally, with regard to recording information on the distributed ledger, optionally only partial information is recorded, such as for example only selected fields of data and/or hashes of agreement reached and/or status of said agreement or payment.

Alternatively, at least selected fields of data and/or hashes of agreement reached and/or status of said agreement or payment are recorded. Optionally and additionally, such recording may also comprise recording an actual invoice, a record of purchase, an actual agreement and a record of payment.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1 shows an exemplary, non-limiting system for providing invoice and/or credit financing;

FIGS. 2A and 2B relate to exemplary overall general processes for a supplier or buyer to obtain funding in relation to invoices or purchase;

FIGS. 3A, 3B1, 3B2 and 3C show exemplary nonlimiting systems for interactions between the supplier, the funding system, the funding marketplace, and optionally the buyer, in more detail;

FIG. 4 shows an optional and exemplary flowchart for the operations of the funder system; and FIGS. 5A and 5B show an exemplary system with optional funding flows for underwriting, smart contract and the distributed ledger.

DESCRIPTION OF AT LEAST SOME EMBODIMENTS

As shown in FIG. 1, there is provided a system 100 which features a supplier computer 102, and a supplier interface 104; a Procure-to-Pay (P2P) system 110A, operating a workflow engine 112; a buyer computer 106, operating a buyer interface 108; all of which are connected to Internet 140. P2P system 110A may also comprise, or be replaced by, a B2B eCommerce system 110B. A B2B eCommerce system may optionally comprise any such system for supporting eCommerce or any other type of computer network or internet based commerce between two or more businesses.

In turn, through Internet 140, these components are connected to a funding marketplace server 120, which is operating a funding engine 122 and which includes a distributed ledger 124, supplier/buyer database 126, a smart contract 132, and an analytics engine 128. In addition, these components are connected to a funder's system 130, which in turn operates a funder interface 131, a distributed ledger 124, a smart contract 132, and an underwriting engine 134.

Within this system, the supplier, which is controlling and operating supplier computer 102, through supplier interface 104, decides that an approved invoice or invoices are to be offered for sale. Offering these invoices for sale based on buyer's credit is sometimes known as "Reverse Factoring" or "Supply Chain Finance." In this process, a supplier essentially sells the approved invoices to a funder, that is an entity which provides funds. This entity then undertakes to collect the sold invoice or invoices from the original buyer of the product from the supplier, which generated the invoices. The system can provide liquidity and more rapid payment to the supplier, than the buyer might normally otherwise provide.

In this system, supplier computer 102 through supplier interface 104, indicates that it wishes to sell an invoice. This invoice may optionally be stored on the P2P system 110A, operating workflow engine 112. In this instance, supplier computer 102, would then through supplier interface 104, contact P2P system 110A, through workflow engine 112, and would indicate that an invoice being held by P2P system 110A, is to be sold.

Alternatively, supplier computer 102 could simply be operated to indicate that information about an invoice should be copied from P2P system 110A to another system. In either case, the information about the invoice to be sold, is transferred to funding marketplace server 120. Funding marketplace server 120 through funding engine 122, receives this information, and then optionally and preferably extracts, at least metadata about the invoice to be sold, the industry of the supplier who wishes to sell the invoice, and other basic information, and writes it to distributed ledger 124.

Optionally the metadata may be extracted by funding engine 122, or by analytics engine 128. Once this information has been posted on distributed ledger 124, then funder's system 130 also contains this information on its copy of distributed ledger 124. Distributed ledger 124 is optionally and preferably implemented or embodied in a blockchain which may optionally use any type of digital currency or cryptocurrency, including but not limited to Bitcoin.

Indeed, any blockchain which involves a distributed ledger, which preferably requires some type of cryptography, more preferably a public/private key encryption system, hash function or digital signatures, may optionally be used. As long as distributed ledger 124, once a copy is written to one location, for example, a funding marketplace server 120, this change is automatically securely, non-falsifiably, that is completely accurately, replicated to other entities who are interested in this information, such as in this example, funder's system 130.

Funder's system 130, then optionally and preferably uses an underwriting engine 134, to review distributed ledger 124 in order to determine which invoices may be of interest. Optionally in order to prevent funder's system 130 from seeing information to which it is not entitled, a smart contract 132 is set up between funder's system 130 and funding marketplace server 120 with cryptographic keys or digital signatures to access different aspects of the distributed ledger 124. Smart Contracts are software programs with predetermined rules based on predefined inputs between two or more parties on a distributed ledger. When a condition specified in the code is met, the program automatically triggers a corresponding action.

In this system, smart contract 132 is cryptographically signed by funder's system 130 and funding marketplace server 120, and is automatically securely, non-falsifiably, that is completely accurately, replicated to funding marketplace server 120. Then in that case, funder's system 130 may optionally only see invoices from companies which were indicated previously to be of interest, for example, from a particular industry such as Construction versus, for example, Fashion. If funder's system 130 had only indicated an interest in Construction, not interested in Fashion, then optionally and preferably, smart contract 132 would filter out inappropriate invoices: inappropriate because the supplier is not in the correct industry. This filtering is validated by funding marketplace server 120 with its copy of smart contract 132.

The use of smart contract 132 therefore also enables the protection of confidential information and privacy of non-public companies, and also may prevent unauthorized access to same, with self-enforcing Smart Contract Technology. Such technology also increases the ability to automate the process and therefore to reduce costs. Automation also helps prevent fraud, as invoices that are inappropriate for any reason could optionally be blocked, such that an interested party could not attempt to direct funder system 130 to accept such an invoice. It would also reduce the ability of funder systems 130 to obtain information for which they are not authorized, for example to avoid data "scraping."

Predefined rules and inputs restrict access to relevant parties to a transaction, and would also prevent access by every party in the blockchain. This means that access to funding requests on distributed ledger 124 would be limited to funder systems 130 for which such access is appropriate and would also automatically prevent access by unauthorized third parties, without requiring a separate security system to be built.

Alternatively, funder's system 130 would only have access to those funding requests on distributed ledger 124 which are related to the industry of interest if in fact that is one of the filtering criteria on smart contract 132. Once funder's system 130 decides it is interested in potentially buying the invoices, it makes an offer. It often preferably makes an offer through communication to funding marketplace server 120. Now, the offer may often be recorded on distributed ledger 124. Alternatively, it may be sent directly to funding engine 122 of funding marketplace server 120.

The decision as to whether or not to accept a particular invoice or invoices to make an offer, may often be made automatically through underwriting engine 134, such that the decision is made automatically, according to various criteria and does not involve any human manual approvals. Optionally, human manual approvals, with audit trails, may be added to the process of automatic filtering and decision making made by underwriting engine 134.

Once funder's system 130 has indicated to funding marketplace server 120 that it in fact is interested in purchasing the invoice or invoices of the supplier, this information is sent back to the supplier, for example, through supplier interface 104 on supplier computer 102. Supplier may often receive multiple offers from different funders, such that multiple offers may appear through supplier interface 104. Alternatively, such offers may only reside on funding marketplace server 120, in which case supplier interface 104 may be used to extract the information, for example from funding engine 122 or from a database, such as for example supplier/buyer database 126.

Once the supplier has decided which offer to accept, if any in fact is acceptable, the supplier indicates this through supplier computer 102, and often preferably, supplier interface 104 to funding marketplace server 120, for example to funding engine 122. Next funding marketplace server 120 invokes a smart contract 132. Smart contract 132 often preferably includes such information as a promise to pay, or indeed may often include such information in a digital cryptocurrency such as bitcoin, so in fact it is not only a promise to pay, but in fact it is a guarantee of payment. For example, it may often be considered to be an escrow payment in which payment is made in advance but is not released until certain criteria are met.

If this is the case, then funding marketplace server 120 directs smart contract 132 to make the payment; payment may also optionally be made through funder interface 131. In either case, payment may optionally be made automatically, optionally directly to supplier, for example through supplier computer 102 or to a bank account. Also optionally, payment could be made to a cryptocurrency account, which the supplier may hold, or optionally to P2P system 110A, if in fact this is a system controlling payment as well.

Optionally, funder's system 130 may in fact negotiate with supplier computer 102 more directly, for example to set some perimeters under which payment is made, repayment is to be made, what happens if in fact the buyer does not pay. Once these perimeters have been set, they're optionally and preferably written to an agreement which is stored on supplier/buyer database 126, with its status registered on distributed ledger 124. Then smart contract 132 is invoked to release payment (and/or payment may optionally be made through funder interface 131).

The support for automatic payment, for example through smart contract 132, optionally and preferably supports automatic determination of cost. For example, funding rates and terms are preferably determined by the market through automation of funder's underwriting criteria and smart contract, not intermediary. One aspect of automation which the present invention supports is transparency and security of information; rather than relying upon an intermediary to set prices and to determine risk, information gathered through funding marketplace server 120 and/or through analytics engine 128 may optionally be used to determine price and risk. Similarly, suppliers may choose which price they're willing to accept, again through negotiations of the agreement with the funder, which provides price signals directly to funder system 130.

Such transactions may optionally then become self-directed transactions by funder's underwriting and supplier's selection criteria, respectively, such that the automated filters respond to price signals from the marketplace—further eliminating the need for a separate trusted intermediary.

Again, as always, funding marketplace server 120 validates the activity of smart contract 132, so that funding marketplace server 120 knows how much money and under what conditions funder's system 130 is willing to pay. This information is optionally and preferably required so that funder's system 130 is not allowed to make a bid or indicate that it wishes to pay for the invoices of the supplier without actually, for example, having the funds accessible, having pledged the funds, having the funds present in a location such as a digital cryptocurrency, which would allow payment to be made directly and with a guarantee.

After funder's system 130 makes the payment and updates distributed ledger 124 with all the details of the payment that was made, the payment terms, for example how much was the finance charge and transaction fee that were deducted from the payment.

After the agreement has been written up and stored in supply/buyer database 126, and distributed ledger 124 has been updated with the status, funding marketplace server 120 or optionally funder's system 130 may optionally contact the buyer directly through buyer interface 108. Alternatively, the buyer computer 106 may also have a copy of distributed ledger 124, so it is aware of the transaction has taken place. In any case, preferably the buyer has already indicated, for example through buyer interface 108 to P2P system 110A that in fact these invoices may have been approved.

Now that the ownership of the invoices is legally shifted from the supplier to the funder's system, the buyer would now make payment to the funder's system.

Turning now to FIGS. 2A and 2B, there are provided overall general processes for a buyer or supplier to obtain funding in relation to invoices. Each of the buyer and supplier may optionally be referred to as a "requester".

FIG. 2A shows an exemplary overall process for providing payment to suppliers which wish to sell invoices. In stage 202 of this process 200, the supplier optionally and preferably uses a computer, or other Internet enabled device to access existing P2P system as previously described. Alternatively, the supplier may optionally contact a B2B eCommerce system, which could for example optionally be the supplier's own business partner system, or part of a third party eCommerce platform on which multiple suppliers may optionally participate. P2P and B2B eCommerce systems are both examples of systems that could support payment to suppliers. This is the case where the suppliers using the system to issue invoices indicate optionally to the buyer that an invoice is about to be sold. For example, to be able to have the buyer approve the invoice if in fact the buyer hasn't done so. Alternatively, the funding marketplace server contacts the buyer to approve an invoice that the supplier wants to sell if in fact the buyer hasn't approved the invoice yet.

Next, in stage 204, the supplier optionally and preferably clicks the funding marketplace link on the P2P, which may optionally be an e-procurement, e-invoicing, ERP, or any other type of electronic supplier network or system to sell approved invoices for early payment. Alternatively again, supplier may not need to click on the funding marketplace link on the P2P, but may instead give permission for the funding marketplace server shown in FIG. 1 to contact the P2P system in order to confirm the permission has been given for the invoices to be sold. Optionally and alternatively, the supplier clicks on the funding marketplace for B2B eCommerce system. Next in stage 206, the supplier signs into its own account on the funding marketplace server to add invoice information, if in fact this information was not automatically extracted in the previous stage 204.

In stage 208, the selected invoice or invoices and the supplier/buyer information are preferably added to the supplier/buyer database, and the metadata is extracted to distributed ledger through the funding marketplace server. In stage 210, the funder's system filters new supplier requests on the distributed ledger according to the underwriting criteria through the smart contract. Now optionally, the initial filtering however is taking place on the smart contract which is set up with input from the underwriting engine. The smart contract may optionally first review the distributed ledger, determine which invoice or invoices are of interest, and only then may optionally filter this request to the funder system, optionally automatically, in order to make certain that criteria are matched and also funding amounts are available with the smart contract. All of this would occur in stage 210.

If the underwriting criteria are met, then the funder's system issues an offer to the supplier's account, often preferably through the funding marketplace server, although again alternatively, contact may be made through the distributed ledger. The funding marketplace server may then optionally communicate with the P2P or B2B eCommerce system, or maybe the P2P or B2B eCommerce system also has a distributed ledger. Multiple configurations are possible in order for the funder's system and the supplier to connect with each other. All of this would occur in stage 212.

The supplier then receives offers from various funders based on its own filters, and makes a selection in stage 214. So for example, the supplier in this case may optionally decide that it only wishes to receive offers from funders which give at least 90 cents on every dollar of the invoice being sold, and/or have other types of repayment conditions which meet supplier's own conditions. In stage 216, at the funder's system, the funder is notified when the supplier selects its offer. At stage 218, the funder enters into agreement and provides the funds minus the fees, to the supplier as previously described. Again, there may be multiple entities involved in negotiation. The funder system may communicate directly to the supplier, may optionally communicate through the funding marketplace server, may also optionally communicate through distributed ledger. Also communication may occur through the P2P or B2B eCommerce system. There are multiple ways for communication to occur.

It should be noted that once the agreement has been reached between the funder and supplier in stage 218, regardless of whether it is reached directly through some type of automatic or manual negotiation, or whether negotiation takes place through the funding marketplace server, in the next step the funder records this agreement in the supplier/buyer database, which can be optionally, for example, be organized through the P2P or B2B eCommerce system or separately on the funding marketplace server. Optionally in this stage, funds are released to the supplier. Optionally, in stage 219 the funder system sends the transaction fee to the funding marketplace account at this or a different time. In stage 220, the funder system also preferably adds the status of the agreement to the distributed ledger. Again, this could be the status of the agreement as opposed to the fact the agreement was definitively signed. This would depend on how the agreement process actually worked.

Also optionally, everything could take place in a smart contract between the funder and supplier, such information about it would be placed in the distributed ledger and then both parties could sign electronically through the distributed ledger, or through the P2P or B2B eCommerce system, or in some other manner which would allow the agreement to be ratified. If the agreement was performed automatically, such as for example, the supplier and funder negotiate with each other through the P2P or B2B eCommerce system, to the supplier interface, and the funder system interface, and/or through the smart contract on distributed ledger, then optionally, the amounts would be ratified automatically, the agreement would be ratified automatically, then payment would occur automatically. However, if the agreement occurs outside of this direct interaction, then alternatively, optionally, and preferably, there would be a requirement for both sides to notify a central authority such as a funding marketplace server either directly or alternatively through the distributed ledger before the process could continue.

In stage 222, once the agreement has been reached and all parties have been notified of the agreement, funding marketplace server preferably notifies the buyer to send the full invoice payment to the funder on the invoice due date. Funding marketplace server could optionally be informed through the distributed ledger previously described or through some other mechanism. As to how the buyer is informed, this may optionally occur directly, for example, through the buyer computer, through the P2P or B2B eCommerce system, or indeed through the distributed ledger if the buyer also has a copy. On invoice due date the buyer pays the full invoice to funder in stage 224, and funder records this payment status on the distributed ledger.

FIG. 2B shows an exemplary overall process for providing payment to buyers which wish to obtain funding to be able to pay invoices. In stage 232 of this process 200, the buyer optionally and preferably uses a computer, or other Internet enabled device to access an existing B2B eCommerce system.

Next, in stage 234, the buyer optionally and preferably clicks the funding marketplace link on the B2B eCommerce system. The buyer requests credit financing, such as a line of credit or term payment. Next in stage 236, the buyer signs into its own account on the funding marketplace server to add business information, such as for example current credit information, if in fact this information was not automatically extracted in the previous stage 234. Optionally such information is available automatically through an analysis of the distributed ledger transactions of the buyer.

In stage 238, the selected purchase(s), optionally in the form of an invoice or invoices, and the supplier/buyer information are preferably added to the supplier/buyer database, and the metadata is extracted to distributed ledger through the funding marketplace server. In stage 240, the funder's system filters new buyer requests on the distributed ledger according to the underwriting criteria through the smart contract. Now optionally, the initial filtering however is taking place on the smart contract which is set up with input from the underwriting engine. The smart contract may optionally first review the distributed ledger, determine which invoice or invoices are of interest, and only then may optionally filter this request to the funder system, optionally automatically, in order to make certain that criteria are matched and also funding amounts are available with the smart contract. All of this would optionally occur in stage 240.

If the underwriting criteria are met, then the funder's system issues an offer to the buyer's account, often preferably through the funding marketplace server, although again alternatively, contact may be made through the distributed ledger. The funding marketplace server may then optionally communicate with the B2B eCommerce, or alternatively the B2B eCommerce also has a distributed ledger. Multiple configurations are possible in order for the funder's system and the buyer to connect with each other. All of this would occur in stage 242.

The buyer then receives offers from various funders based on its own filters, and makes a selection in stage 244. For example, the buyer in this case may optionally decide that it only wishes to receive offers from funders according to the funding amount, interest rate, payment terms and the like, and/or have other types of repayment conditions which meet the buyer's own conditions. In stage 246, at the funder's system, the funder is notified when the buyer selects its offer. At stage 248, the funder enters into agreement and provides the funds minus the fees, to the supplier or buyer. Again, there may be multiple entities involved in negotiation. The funder system may communicate directly to the buyer and/or supplier, may optionally communicate through the funding marketplace server, may also optionally communicate through distributed ledger. Also communication may occur through the B2B eCommerce system. There are multiple ways for communication to occur.

It should be noted that once the agreement has been reached between the funder and buyer in stage 248, regardless of whether it is reached directly through some type of automatic or manual negotiation, or whether negotiation takes place through the funding marketplace server, in the next step the funder records this agreement in the supplier/buyer database, which can be optionally, for example, be organized through the B2B eCommerce system or separately on the funding marketplace server. Optionally in this stage, funds are released to the buyer or alternatively to the supplier. In stage 249 the fees may optionally be paid to the funding marketplace account at this or another time. In stage 250, the funder system also preferably adds the status of the agreement to the distributed ledger. Again, this could be the status of the agreement as opposed to the fact the agreement was definitively signed. This would depend on how the agreement process actually worked.

Also optionally, everything could take place in a smart contract between the funder and buyer, such information about it would be placed in the distributed ledger and then both parties could sign electronically through the distributed ledger, or through the B2B eCommerce system, or in some other manner which would allow the agreement to be ratified. If the agreement was performed automatically, such as for example, the buyer and funder negotiate with each other through the B2B eCommerce, to the buyer interface, and the funder system interface, and/or through the smart contract on distributed ledger, then optionally, the amounts would be ratified automatically, the agreement would be ratified automatically, then payment would occur automatically. However, if the agreement occurs outside of this direct interaction, then alternatively, optionally, and preferably, there would be a requirement for both sides to notify a central authority such as a funding marketplace server either directly or alternatively through the distributed ledger before the process could continue.

In stage 252, once the agreement has been reached and all parties have been notified of the agreement, funding marketplace server preferably notifies the buyer to send the full invoice payment, or alternatively a partial (term) payment, to the funder on the invoice due date. Funding marketplace server could optionally be informed through the distributed ledger previously described or through some other mechanism. On invoice or term due date the buyer makes the payment to funder in stage 254, and funder records this payment status on the distributed ledger.

FIGS. 3A to 3C show exemplary nonlimiting systems for interactions between the supplier, the funding system, the funding marketplace, and optionally the buyer, in more detail. FIG. 3A shows an exemplary optional system flow which includes all parts of FIG. 3.

Turning now to FIGS. 3B1 and 3B2, there are shown exemplary flows for supplier-side and buyer-side for system 300, respectively. FIG. 3B1 shows an exemplary supplier-side flow for system 300. As shown, supplier computer A, shown as computer 102, is communicating as shown with regard to FIG. 1 with a P2P, or Procure-to-Pay system 110A which may actually be e-procurement, e-invoicing, ERP, or any other type of electronic supplier network or system that in turn, communicates with buyer computer A 106. Now, in this example, the buyer computer A 106 issues a purchase order to the supplier through the P2P system 110A, shown as flow 360. The supplier computer A sends the invoice for approval to buyer computer A, shown as flow 362. Approval of the invoice is then received in flow 364, again from P2P system 110A, by the supplier.

Although P2P system 110A is shown as a "P2P", optionally P2P system 110A may be or may comprise a B2B eCommerce system, shown also as 110B.

On the buyer side, the flow may optionally be performed as follows. Buyer computer A 106 issues the purchase order 366 and receives the invoice 368 as shown, through P2P system 110A. Buyer computer A 106 then approves the invoice 372 at P2P system 110A.

Supplier computer A 102, P2P 110A, and buyer computer A 106 all communicate with funding marketplace server 120 through a computer network, which in this case is shown as computer network 302. 304 and 306 are optionally going to be the same or different computer networks. Also as shown with regard to funding marketplace server 120, it communicates with the supplier computer A 102, P2P 110A, and buyer computer A 106 through each of the respective computer networks 302, 304, and 306, and through an API gateway 308. API gateway 308 allows each computer to optionally use its own preferred software to communicate with the funding marketplace server 120. They can also use software approved by funding marketplace server 120, but for example, P2P 110A may communicate with API gateway 308 through a shared set of API interfaces which would allow both components to communicate without requiring specialized software to be installed in each computer separately. API gateway 308 in turn, allows the various components within funding marketplace server 120 to be reached, such as, for example, funding engine 122, supplier/buyer database 126, smart contract 132, distributed ledger 124, and analytics engine 128.

The flow may optionally be performed as follows. As previously described, the purchase order and invoice flow would occur, however, this flow is not directly required for funding marketplace server 120, it's simply provided as an example for how the different components may optionally communicate for invoices to be declared to be ready for offer for sale. Assuming now that the offer for sale process has been performed, such as the invoices are ready to be offered for sale at some sort of discount price on the dollar as previously described, supplier computer A 102 communicates with funding marketplace server 120 to register and open an account in process 350. In process 352 optionally and preferably funding marketplace server 120 must perform some type of business validation of the supplier. This may optionally require communication with supplier computer A 102 and or with P2P system 110A. After this business validation process has been completed, supplier computer A 102 may optionally then decide to request funding by selling invoices. This is preferably communicated as funding request 354 to funding marketplace server 120.

As previously described, the funding side process occurs which is not described here, and then funding marketplace server 120 sends an offer to supplier computer A 102 as funding offers 356. Now, optionally and alternatively funding marketplace server 120 may communicate with P2P 110A for such funding offers, but this is not required. Supplier computer A 102 would then select an offer 358 and communicate that back to the funding marketplace server. Again, this process continues as was previously described with the supplier receiving the funds after the supplier and the funder had agreed, etc. After these processes have been performed, optionally and preferably the funding marketplace server 120 would notify the buyer to pay the full invoice to funder in flow 370 to buyer computer A 106. Optionally, buyer computer A 106 could even pay through funding marketplace server 120 and/or record on a distributed ledger accessible to funding marketplace server 120 the effective payment being made. For example, by paying, by using the cryptocurrency, or some other payment purpose where funder may be informed. If not, then buyer computer A 106 directly, and/or through P2P 110A, or through some other system may optionally communicate this information to funding marketplace server 120 either directly or alternatively by communicating with the funder system.

If on the other hand the buyer, through buyer computer A 106 for example, wished to seek financing for a purchase, then preferably the flow would operate as shown with regard to FIG. 3B2 for a system 300. As shown, the components are the same or similar as for FIG. 3B1, although preferably a B2B eCommerce system 110B is included. However, now additional flows are added between buyer computer A 106 and funding marketplace server 120. These additional flows preferably comprise registration of the buyer through buyer computer A 106 to open an account (351), followed by business validation (353). Such business validation 353 may optionally be two-way validation, as information may flow bi-directionally.

Next, buyer computer A 106 issues a funding request (355) and receives one or more funding offers (357). The buyer, through buyer computer A 106, selects an offer (359) and is then notified to make a complete or partial payment to the funder (370).

Preferably, as shown, P2P system 110A is now B2B eCommerce system 110B.

As shown with regard to FIG. 3C there is shown a funder-side flow for system 300. This flow includes communication between funding marketplace server 120 and funder system 130 which optionally, preferably occurs through a computer network 307; which again, may be different or similar to previously described computer networks. Again, an API gateway 308 optionally and preferably allows funder system 130 to communicate using its own preferred software, using software approved by funding marketplace server 120, or in any manner which is compatible with communication through API gateway 308. The same components are shown for funding marketplace server 120, as per FIGS. 3B1 and 3B2, to be accessible by the funder system 130 with the same numbers.

Funder system 130 posts an offer to funding request A in flow 180. Optionally, before this funder system 130 may go through some type of due diligence, for example, in setting up the smart contract 132, which is preferably accessible to funding marketplace server 120 so as to demonstrate to funding marketplace server 120 that funder system 130 actually has the money in hand to be able to make these payments. Also, optionally and preferably through smart contract 132 funder system 130 would indicate underwriting criteria to funding marketplace server 120 simply by filtering the distributed ledger 124 so as to be able to see which funding requests are actually of interest.

Once all these processes have taken place, then an offer is posted in process 180. If the offer is accepted by the supplier, then this offer accepted communication is optionally performed as flow 182, alternatively instead of occurring from funding marketplace server 120, it may occur from P2P 110A, for example. An agreement is reached in flow 184 which may optionally occur through funding marketplace server 120 and/or through P2P 110A and/or through supplier computer 102 or some combination of the above. Once agreement has been made, then funder system 130 releases the funds to the requester in flow 186. This release may optionally be automatic if there's a smart contract involved, such as smart contract 132 and the digital cryptocurrency. Again, payment may come from smart contract 132 or from otherwise funding marketplace server 120, and may occur through bank or may occur in some other form. However, funding marketplace server 120 is preferably updated as to the fact that funds are released, for example, through the distributed ledger 124. Funder system also sends transaction fee to funding marketplace at this or another time in flow 187. Next payment by the buyer occurs in flow 188. Again, this flow may occur through funding marketplace server 120, and may occur through bank, or through the distributed ledger 124, through some type of smart contract, but in any case, funding marketplace server 120 is informed. Also, optionally and preferably aggregate data by industry segment etc. is provided in flow 190 to funder system 130.

Turning now to FIG. 4, there is shown an optional and exemplary flowchart 400 for the operations of the funder system. In stage 402, all funding requests are posted on the distributed ledger. Optionally, these funding requests may only include metadata, such as, for example, the industry, whether construction, fashion, or some other industry, for example, the amount of the invoice, and some other general metadata information that does not specifically identify either the supplier or the buyer. In some cases, optionally, one party is identified (such as the requester), but not the other.

In stage 404, the funder sets up a smart contract to select the funding request based on underwriting criteria. As previously described, optionally, only certain funding requests are set up to be shown to the funder system. Also optionally, once the metadata has been shown and the funding system then indicates, according to its underwriting criteria, that it's interested in the funding request, then optionally and preferably more details about the funding request are shown including, for example, the supplier, the buyer, and optionally also credit and other information which has been provided to the funding marketplace server.

The smart contract optionally and preferably includes a digital cryptocurrency for automatic payment, and/or proof of funds held in escrow under some other system, as well as optionally and preferably including the conditions under which the funds may be released. The smart contract may optionally be preloaded with funds in a stage 401, which may actually occur before the funding system is even allowed to review any funding requests.

Now, if the smart contract has been set up to be able to select the funding requests based on various criteria, and there's no match, as stated in stage 406, then optionally the underwriting criteria may be adjusted in stage 408 such as, for example, at the funding system where the funder may decide to change the criteria of the smart contract and/or other underwriting criteria, which would then be communicated somehow to the funding marketplace server, either through a smart contract on the distributed ledger, or through some other mechanism such as funder interface 131.

However, alternatively, if in stage 406 there is a match, then in stage 410, the funding marketplace server must review the match to determine whether or not it's actually valid. For example, the funding marketplace server needs to validate the existence of the preloaded smart contract: are enough funds loaded? Do the criteria actually match? If the funding marketplace server for whatever reason fails to validate this particular match, then the transaction terminates in stage 412. It would also terminate if from stage 408 the underwriting criteria are not adjusted.

Turning back now to stage 410, if in fact validation occurs by the funding marketplace server, then the funding marketplace server actually and preferably provides detailed financial and transactional data to the funder in stage 411. Optionally then in stage 413, it is determined whether to proceed with funding. For example, the funder or funding system may now decide that upon receipt of the extra additional detailed financial and transactional data, it does not wish to proceed, this may actually be done automatically, for example, through a smart contract, through an underwriting engine or some other automatic type of analysis or may occur optionally with a combination of other automatic processes.

If the funding request is not accepted from stage 413, then the transaction terminates in stage 412. If it is accepted from stage 413, then an offer is posted to the requester (supplier or buyer) account on the funding marketplace server in stage 414. This offer preferably includes such items as payment conditions, for example, what would happen if the buyer failed to pay the funding system as opposed to the supplier, and the finance charge and transaction fee charged to the supplier. Alternatively for the buyer side, the conditions would include consequences due to failure of the buyer to pay, the finance fee and transaction fee charged to the buyer, and so forth. All of these parameters would need to be included in the offer.

As previously described also, it is possible that the offer would be posted from the funding marketplace server to a P2P or B2B eCommerce system, directly to the requester, or through some combination of the above. Preferably, however, this is at least recorded on the requester account on the funding marketplace server, again optionally through a distributed ledger, or some other type of information which is available to all parties, or at least to several parties. If the offer is accepted by the requester in stage 416, then an agreement is entered into and the funds are released in stage 417. Transaction fees to the Funding Marketplace are released in stage 418 at this or another time. Otherwise, the transaction would terminate in stage 412, as previously described.

FIG. 5 shows an exemplary system 500 with optional funding flows for underwriting, smart contract and the distributed ledger, in two parts (FIGS. 5A and 5B), to which reference will be made simultaneously. The system process starts with the funding request by requester (supplier or buyer) in stage 502. The information of the invoice, financials and transaction data is optionally and preferably loaded from the P2P system or from the B2B eCommerce system by API to the funding marketplace server in stage 504. This information may optionally be derived from the supplier/buyer database or may optionally be loaded from the P2P or B2B eCommerce system directly to the supplier/buyer database, which would occur then in stage 506.

The non-confidential information is preferably first extracted to the distributed ledgers previously described. This non-confidential information preferably does not identify the requester. It may also optionally not identify the other side to the transaction, other than the requester. The distributed ledger then is written to in stage 510. The information which has been entered may optionally include but is not limited to an invoice amount, a term for repayment (for the buyer), the related industry, related revenue information, geographical information, a determination of credit worthiness (preferably of the buyer but optionally of the supplier) and the like. Optionally, such information may also relate to the invoice sale status, payment status and the like.

Now, once this process continues, the blockchain, now shown in stage 512, may optionally cause this information to be automatically securely, non-falsifiably, that is completely accurately, replicated to the distributed ledger, having the same copy for each funder in stage 514.

Now once this happens, preferably further processing will occur, but let's turn back now to the funder side. The funder's underwriting action needs to be connected via API to the funding marketplace server in stage 516. As part of this process a smart contract with the funder's underwriting criteria needs to be prepared in stage 518. This would also need to be acceptable to the rules of the funding marketplace server. A smart contract needs to be preloaded with funds either as part of the setting up process or shortly after approval by the funding marketplace server, shown here as flow 517. This may occur concurrently with 518, setting up the smart contract, before the rest of the smart contract setting up process occurs. As previously described, the smart contract may optionally be preloaded with digital cryptocurrency funds, which has the advantage of enabling immediate release upon agreement between all parties that the criteria have been met.

Now, the smart contract is shown for each funder and is written to the system in stage 520 and it is replicated, via blockchain process in stage 522, to the funding marketplace server which needs to validate all smart contract actions. The blockchain then in stage 522 may optionally and preferably write a copy of the smart contract to the distributed ledger; however optionally only authorized parties are able to access the smart contract. For example, preferably the funding market place server can access all smart contracts for all funders, but each funder is only able to access its own smart contract.

Now the pieces are in place for both parties to negotiate. The funding request from the supplier has been made, the funder has already shown the ability to provide the funds, has set up the smart contact with the underwriting engine, and now the process may proceed for an optional agreement between the two parties. Turning now to the left-hand part of the diagram, once a smart contract 520 has been set up, at each stage once there is the possibility of the funding system funding something from some kind of contract from a requester, then in stage 526, the smart contract is validated by the funding marketplace server. If validation cannot be shown in this stage, then the transaction terminates as previously described and as shown here in stage 528.

If, on the other hand, the funding request metadata matches funder's underwriting criteria, as shown in stage 530, then again, optionally and preferably, the smart contract is validated in stage 526. The smart contract may be validated at several points: when it is set up, periodically according to criteria set by the funding marketplace server, and optionally and preferably each time a funding request could potentially be funded by a particular smart contract owned by a particular funder.

If the funding request metadata does not match funder's underwriting criteria, then this goes to stage 532 in which funder's underwriting criteria might optionally be adjusted. This would allow funders to optionally expand to other industries or to other company types, to compete for their financing, even though their underwriting criteria would have previously blocked them from potentially financing such requests. If the underwriting criteria is not to be adjusted, such as the funding request simply does not match funder's underwriting criteria, then again the transaction may optionally terminate, shown here as stage 534.

Assuming that the criteria match, that there are sufficient funds and that the smart contract has been validated, the process now proceed to stage 536, in which the funder is given access to detailed financial data about the transaction, for example, optionally about the supplier, about the buyer, about their credit history, perhaps even about their credit history with the funding marketplace server, although such information may have been generally released before, optionally is only re-released in details at this point.

If at this point the funder still wishes to proceed with funding, as shown in stage 538, then the process would optionally and preferably continue with stage 540. Otherwise, it would optionally and preferably terminate at stage 539. Assuming that, in fact, the process does continue at stage 540, the funder posts an offer to the requester account in the funding marketplace server or alternatively may post through the P2P or B2B eCommerce system as well additionally, and/or may post through distributed ledger or the smart contract may optionally contact a similar smart contract on the requester side, so the requester's selection criteria may be considered as well. For example in this case, the supplier might have a smart contract to indicate how much of a discount it's willing to accept for an invoice. Perhaps the supplier's only willing to accept a 10% discount but not more than that, or may have other requirements. For example, what would happen if the buyer doesn't pay? To what extent is the supplier liable? Similar conditions may optionally be made for buyer side financing. Optionally, a direct match may be made through a similar smart contract or other type of filter at the requester side.

If, for whatever reason, the offer is accepted by the requester, then in stage 544, the funder would enter into agreement with the requester and release the funds. Transaction fee to the funding marketplace is released at this or another time in stage 545. This may optionally occur by smart contract to smart contract through automatic negotiation or various other ways, depending on how this is implemented. Once the agreement has been reached and funds have been released, then the supplier/buyer database and distributed ledgers optionally and preferably are updated in stage 546. If, on the other hand, the offer is not accepted by the requester in stage 542, then in stage 548 the transaction optionally terminates.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A system for financing a purchase according to a plurality of invoices, comprising
   a. A supplier computer for issuing an invoice for said purchase;
   b. A buyer computer for receiving said invoice for said purchase;
   c. A funder computer for financing said purchase through a funder system;
   d. A distributed ledger for recording said invoice and said purchase, and for recording an agreement if reached between said funder system, and said supplier computer or said buyer computer to finance said purchase, and for recording payment if made from said funder system; and
   e. A funding marketplace server for managing a request for financing for said invoice and for managing an offer for financing from said funder system, said funding marketplace server accessing said distributed ledger for recording said invoice upon receipt of an offer to finance from said funder system to said supplier computer, and for recording an agreement if reached between said funder system and said supplier computer, and for recording payment if made from said funder system; wherein said funding marketplace server further comprises a smart contract for determining said agreement between said funder system and said supplier computer, wherein said smart contract features a plurality of underwriting criteria for said funder system; wherein said smart contract is embodied at said distributed ledger and wherein said funder system also access said smart contract; wherein said smart contract further receives a plurality of parameters from said funder system for financing invoices and filters said invoices according to said parameters for selecting said invoice for financing.

2. The system of claim 1, further comprising an electronic invoice system for managing said invoice.

3. The system of claim 2, further comprising a P2P system for managing payment of said invoice from said electronic invoice system.

4. The system of claim 3, wherein said electronic invoice system is managed through said distributed ledger by an invoice management smart contract.

5. The system of claim 1, wherein said distributed ledger is implemented according to blockchain technology.

6. The system of claim 5, wherein said blockchain technology is permissionless.

7. The system of claim 6, wherein said blockchain technology comprises bitcoin or Ethereum or other digital cryptocurrency.

8. The system of claim 7, wherein said blockchain technology is permissioned.

9. The system of claim 8, wherein said blockchain technology comprises Hyperledger or other distributed ledger.

10. The system of claim 9, wherein said recording said invoice and said purchase, and agreement and/or payment if performed, comprises recording an actual invoice, a record of purchase, an actual agreement and a record of payment.

11. The system of claim 1, further comprising managing said invoice through said supplier computer.

12. The system of claim 1, wherein said smart contract receives escrow funds from said funding system and wherein said smart contract releases said funds upon said recording of said agreement.

13. The system of claim 12, wherein said release of funds is performed automatically by said smart contract upon said recording of said agreement.

14. The system of claim 1, further comprising a B2B eCommerce system to support a purchase by said buyer computer, wherein said B2B eCommerce system receives said offer from said funding system and relays said offer to said buyer computer.

15. The system of claim 14, further comprising recording a plurality of transactions between said buyer computer and said supplier computer on said distributed ledger.

16. The system of claim 1, wherein said recording said invoice and said purchase, and agreement and/or payment if performed, comprises recording only selected fields of data and/or hashes of agreement reached and/or status of said agreement or payment.

17. The system of claim 1, wherein said recording said invoice and said purchase, and agreement and/or payment if performed, comprises recording at least selected fields of data and/or hashes of agreement reached and/or status of said agreement or payment.

18. The system of claim 17, wherein said recording said invoice and said purchase, and agreement and/or payment if performed, comprises recording an actual invoice, a record of purchase, an actual agreement and a record of payment.

19. The system of claim 1, wherein said smart contract performs said filtering according to an industry of a supplier associated with said supplier computer for issuing said invoice.

20. The system of claim 1, further comprising plurality of funder systems, wherein said funding marketplace server further receives a plurality of offers from said plurality of funder systems for a plurality of invoices, and wherein said smart contract further receives a plurality of price signals from said plurality of funder systems according to agreed prices for said plurality of invoices.

21. A method for financing an invoice issued by a supplier computer through an invoice management system, wherein said financing is performed through a funder system, the method comprising connecting said invoice management system to a distributed ledger; recording a request for financing from said invoice management system to said distributed ledger; receiving a plurality of parameters for financing invoices from said funder system by a smart contract, wherein said smart contract features a plurality of underwriting criteria for said funder system; wherein said smart contract is embodied at said distributed ledger; filtering said request according to said parameters by said smart contract; if said funding request meets said criteria of said funding system as determined by said smart contract, sending an offer for said financing through said distributed ledger; and if said offer is accepted, recording said acceptance through said distributed ledger.

22. The method of claim 21, wherein said financing is performed to a supplier account, further comprising accepting said offer by said supplier computer according to one or more acceptance criteria.

23. The method of claim 21, wherein said financing is performed to a buyer account, further comprising accepting said offer by said buyer computer according to one or more acceptance criteria.

24. The method of claim 21, further comprising making a payment by said funder system to a funding marketplace account.

25. The method of claim 21, further comprising performing said filtering by said smart contract according to an industry of a supplier associated with said supplier computer for issuing said invoice.

26. The method of claim 21, further comprising receiving a plurality of offers for purchasing a plurality of invoices from a plurality of funder systems, receiving a plurality of price signals from said plurality of funder systems according to agreed prices for said plurality of invoices by said smart contract, and determining an offer for said financing by said smart contract according to said plurality of price signals.

* * * * *